United States Patent [19]

Austin

[11] 4,404,099
[45] Sep. 13, 1983

[54] SLUDGE THICKENING

[75] Inventor: Eric P. Austin, Sandbach, England

[73] Assignee: Simon-Hartley Limited, Staffordshire, England

[21] Appl. No.: 344,878

[22] Filed: Feb. 1, 1982

Related U.S. Application Data

[63] Continuation-in-part of Ser. No. 148,479, May 9, 1980, abandoned, which is a continuation of Ser. No. 969,316, Dec. 14, 1978, abandoned.

[51] Int. Cl.³ ............................................. B01D 33/04
[52] U.S. Cl. .................................. 210/205; 210/247; 210/396; 210/400
[58] Field of Search ............... 210/609, 702, 732–734, 210/769, 770, 198.1, 391, 396, 400, 401, 407, 409, 205, 393, 247

[56] References Cited

U.S. PATENT DOCUMENTS 3,200,949  8/1965  Aulich et al. ...................... 210/400
3,531,404  9/1970  Goodman et al. .................. 210/400
3,896,030  7/1975  Bahe .................................... 210/401
4,142,971  3/1979  Le Fur et al. ....................... 210/400
4,158,627  6/1979  Ingemarsson ...................... 210/400

FOREIGN PATENT DOCUMENTS 426718  1/1975  U.S.S.R. .............................. 210/400

OTHER PUBLICATIONS

*The Condensed Chemical Dictionary*, 8th Edition, 1971, p. 729.

*Primary Examiner*—Peter A. Hruskoci
*Attorney, Agent, or Firm*—LeBlanc, Nolan, Shur & Nies

[57] ABSTRACT

A sludge thickening apparatus for dosing sludge with a cationic polyelectrolyte, allowing time for the development of a floc structure, placing the dosed sludge onto a surface through which liquid may drain freely by gravity in such a manner that the floc structure is retained, and removing the thickened sludge from said structure.

7 Claims, 2 Drawing Figures

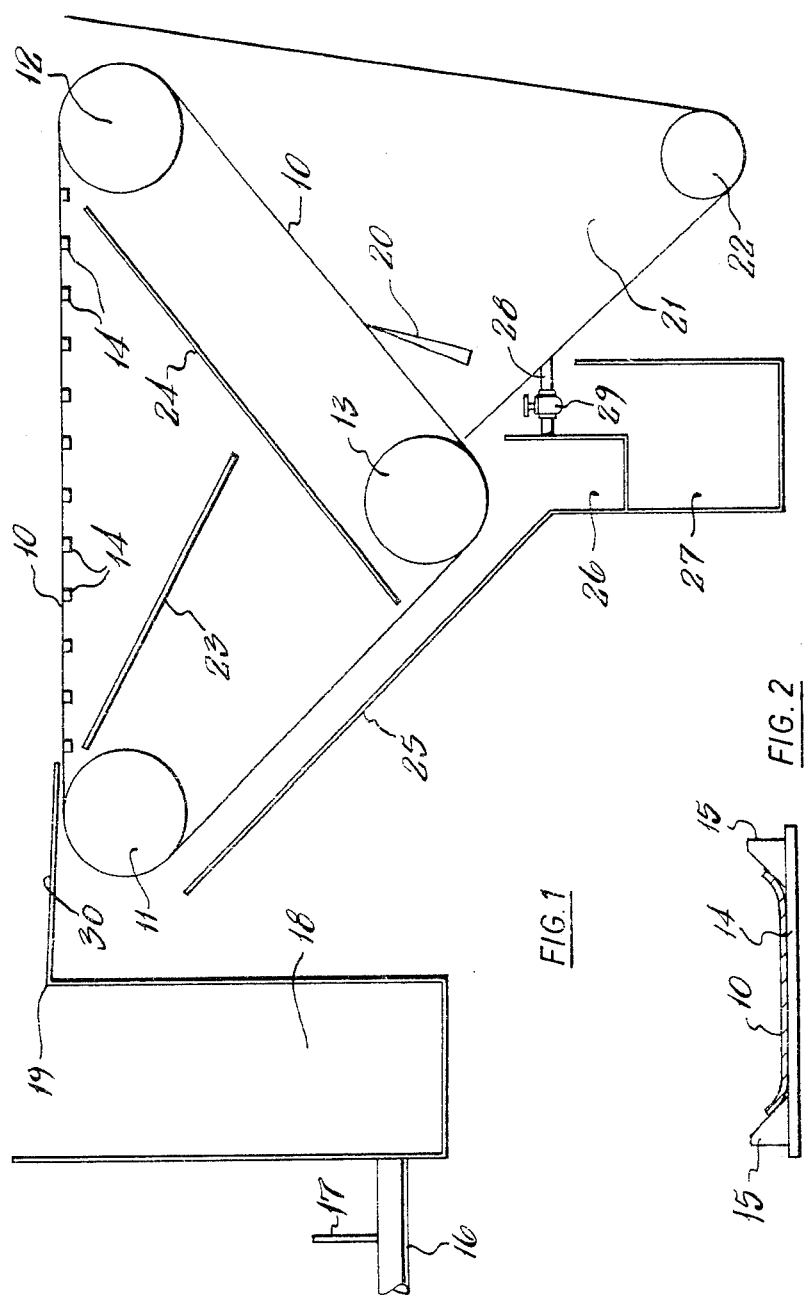

SLUDGE THICKENING

RELATED APPLICATIONS

This application is a continuation-in-part of my earlier application Ser. No. 148,479 filed May 9, 1980 (now abandoned) which in turn is a continuation of my now abandoned application Ser. No. 969,316 filed Dec. 14, 1978 (now abandoned).

FIELD OF INVENTION

This invention relates to an apparatus for thickening sludge particularly, though by no means exclusively, activated sludge.

BACKGROUND AND SUMMARY OF INVENTION

For many years activated slutch has been thickened by passage through a settling tank such that the residence time in the tank is of the order of 24 hours. This technique, besides requiring much time and large equipment, has the disadvantage that the thickened sludge will have a solids concentration of only 1.5 to 2.0% by weight.

With a view to obtaining higher levels of solids in the concentrated sludge, various techniques have been developed utilizing sophisticated equipment such as floatation apparatus where suspended solids contained within the sludge are carried to the surface by small bubbles of gas produced by electrolytic action or out of solution.

Such floatation apparatus is effective in removing water from the sludge so that the concentrated sludge will have 5% solids by weight or thereabouts. This technique has a number of disadvantages in that the equipment used is costly to purchase and maintain and that the processing costs are high.

The applicant has conducted an extensive research program with a view to finding an apparatus of thickening sludge to have a concentration of the order of 5% by weight of solids with simple equipment and in an economical manner.

The present invention is based upon the discovery that if the sludge is dosed with a cationic polyelectrolyte and then handled very gently, it will become relatively free draining.

According to the present invention, the apparatus for thickening a sludge comprises a structure for dosing the sludge with a cationic polyelectrolyte, allowing time for the development of a floc structure, placing the sludge onto a surface through which liquid may drain freely in such a manner that the floc structure is retained and removing the thickened sludge from said surface.

The invention will be further apparent from the following description with reference to the figures of the accompanying drawing which show, by way of example, only one form of apparatus embodying the invention.

DESCRIPTION OF DRAWINGS

FIG. 1 shows a diagrammatic vertical cross-section through the apparatus; and

FIG. 2 shows a cross-section on the line II—II of FIG. 1.

DETAILED DESCRIPTION

Referring now to the drawing, it will be seen that the apparatus is essentially comprised by an endless band 10 of mesh material which is supported and guided by rollers 11, 12 and 13, one of which is connected to a motor (not shown) for the purposes of driving the band in the direction of the arrows shown.

The band 10 extends generally horizontally between the rollers 11 and 12. The horizontal run of the band 10 between the rollers 11 and 12 is supported by a plurality of transversely extending longitudinally spaced paralled bars 14. Each of the bars 14 mounts an upstanding wedge-shaped member 15 at each of its opposite ends, thus forming a trough-like support for the band 10. The distance between opposite members 15 on the bars 14 is less than the width of the band 10, whereby the latter is contrained to assume a trough-like configuration during passage through the horizontal run between the rollers 11 and 12.

It will be understood that whilst the band 10 is adequately supported over the whole of its length in the horizontal run extending between the rollers 11 and 12, the arrangement is nonetheless such as to offer the minimum of resistance to the free drainage of liquid through the band.

Sludge to be thickened is introduced to the apparatus through a pipe 16. The sludge is dosed with a cationic polyelectrolyte as it passes through the pipe 16, the polyelectrolyte being injected into the pipe 16 through a duct 17. The dosed sludge is passed into a small holding tank 18 which ensures sufficient residence time to enable a floc structure to develop as a result of the addition of the polyelectrolyte before the sludge leaves the tank 18 by overflow at a weir 19. As shown in FIG. 1, the sludge, after passing over the edge of weir 19, flows directly downwardly over a chute 30 of extremely shallow gradient to be deposited on the upper surface of the band 10 without substantial forward velocity relative to the band at the start of the horizontal run extending between the rollers 11 and 12. As the sludge is conveyed over the horizontal run between the rollers 11 and 12, liquid drains therefrom through the band 10.

A scraper blade 20 is provided to remove the bulk of thickened sludge from the surface of the band 10 as it passes between the rollers 12 and 13. The sludge which is removed by the blade 20 falls into a collecting hopper 21 from which it can be removed through an outlet 22.

Guide plates 23 and 24 are provided to collect liquid which passes through the band 10 between the guide rollers 11 and 12 and direct it into a single stream extending over the width of the band 10 for flow therethrough as the band 10 passes between the rollers 13 and 11, thus to wash residual traces of sludge from the band. The liquid flowing through the band between the rollers 13 and 11 is collected on a guide plate 25 which directs it into a gutter 26 from which the liquid overflows into a drain 27. A pipe 28 containing a valve 29 extends between the gutter 26 and the hopper 21 whereby a portion of the liquid can be returned to the thickened sludge if it should be too dry for the intended following process.

It is important that no suction or vibration or other technique commonly regarded as an aid to filtration be applied to the horizontal run of the band between the rollers 11 and 12 as such rapidly destroys the floc structure and prevents free drainage. It is also important that the method of passing the dosed sludge to the band does not subject the sludge to any violent movement as this again would destroy the flow structure.

It will be appreciated that it is not intended to limit the invention to the above example only, many variations, such as might readily occur to one skilled in the art, being possible without departing from the scope thereof.

Thus, for example, a vibrator device may be provided to operate on the band 10 between the rollers 12 and 13 for the purposes of displacing thickened sludge therefrom in place of the scraper blade 20. It is important however, to ensure that the arrangement is such that no significant vibration is imparted to the band between the rollers 11 and 12.

From the drawings and the foregoing description, it will be appreciated that no device of any kind is used to agitate or mix the dosed sludge in tank 18. The floc structure formed in tank 18 therefore stays intact without disturbance as the dosed sludge rises to the level of weir 19.

The discharge edge of weight 19 is straight and level and is formed at the juncture between tank 18 and the upstream end of chute 30 as shown in FIG. 1 so that the sludge is discharged over the weir directly onto chute 30. This construction enables the dosed sludge to flow smoothly and freely over the weight and onto chute 30 without destroying or otherwise objectionably disturbing the floc structure in the sludge.

To avoid disturbance of the floc structure as the sludge is transferred along chute 30 to band 10, chute 30 is provided with an extremely shallow, uniform gradient or slope extending all the way from the discharge edge of weir 19 at the upper end of the chute to the lower, discharge end of the chute such that the acute angle between the chute and a horizontal plane containing the band's horizontal run is 5° or less. Furthermore, the discharge end of chute 30 has a very small insignificant thickness and lies immediately adjacent to and virtually contiguous with upper horizontal drainage run of band 10 with no more than just enough clearance to allow for unimpeded movement of the band. Chute 30 is therefore nearly at the same level and altitude of the upper horizontal drainage run of band 10 to avoid distortion or other disturbance of the floc structure as the sludge is transferred from weight 19 to band 10.

The shallow slope of chute 30 and location of the chute's discharge end relative to the drainage run of band 10 are such that the dosed sludge stream will be deposited on the horizontal drainage run of band 10 without any abrupt vertical displacement and without any substantial forward velocity relative to the traveling horizontal run of the band and substantially without change in direction at the region where the sludge is deposited on the band. This construction ensures that the sludge will be gently deposited on band 10 without distorting or objectionably disturbing the floc structure.

In the illustrated embodiment, the sludge-receiving surface of chute 30 is flat to avoid disturbance of the flock structure as the sludge flows along the chute. Alternately, chute 30 may be fluted with longitudinally extending corrugations to form parallel, spaced apart longitudinally extending, sludge-receiving channels or grooves for dividing the sludge into discrete streams without destroying or otherwise objectionably disturbing the floc structure.

From the drawings and the foregoing description, it also will be appreciated that all of the liquid to be removed from the dosed sludge is freely drained solely by gravity and without the aid or any suction as the sludge is conveyed along the horizontal drainage run of band 10 between rollers 11 and 12. It also will be observed that the suctionless drainage of liquid from the sludge on band 10 is carried out without pressing, squeezing, vibrating or otherwise disturbing the floc-containing sludge on the horizontal drainage run of band 10.

The foregoing features of this invention thus cooperate to avoid disturbance of the floc structure as the dosed sludge travels no only from tank 18 to band 10, but also throughout the entire horizontal drainage run of band 10 where the complete drainage of liquid takes place. The floc structure therefore remains intact throughout the movement of the sludge from tank 18 to the downstream end of the horizontal run of band 10 overlying roller 12 to thereby reduce the amount of floc-producing agent required for a given operation.

What is claimed is:

1. A sludge thickening apparatus comprising means for dosing sludge to be thickened with a floc-producing agent, a tank for receiving and holding the dosed sludge for a sufficient period of time to allow for the development of a floc structure, means comprising a movable, sludge-receiving, liquid permeable band for draining all of the liquid to be removed from the floc-containing sludge solely under the influence of gravity to thicken the sludge without pressing or otherwise disturbing the floc-containing sludge, said band having a sludge-receiving, liquid drainage run which extends at least generally horizontally, means for conveying the floc-containing sludge from said tank to said run in such a manner that said floc structure is retained, means (a) for supporting said band for travel along an endless path and (b) for driving said band for conveying the floc-containing sludge along said run, and means for removing the sludge from the band after the sludge passes beyond said run, said sludge conveying means comprising (a) a weir located at a level lying above the level of said run and (b) a chute for delivering sludge from said weir to said run, said weir constituting a sludge outlet for said tank and having a discharge edge located at and at the same level as an upstream end of said chute for discharging the floc-containing sludge from said tank directly onto said chute, said chute being inclined relative to said run such that the angle included between said chute and said run is at an acute angle not exceeding approximately 5 degrees, and said chute extending directly from said discharge edge to nearly the level of said run immediately adjacent to said run for gently depositing the floc-containing sludge on said run, the slope of said chute being sufficiently shallow to deposite the floc-containing sludge on said run without substantial forward velocity relative to that of said run and substantially without change of direction at the region where the sludge is deposited on said run to prevent disturbance of said floc structure, said band providing for the gravity drainage of liquid from the sludge as the sludge is conveyed along said run.

2. The sludge thickening apparatus defined in claim 1 wherein said discharge edge of said weir is formed at a juncture between said chute and said tank.

3. The sludge thickening apparatus defined in claim 2 wherein said discharge edge is straight and level.

4. The sludge thickening apparatus defined in claim 1 wherein said means supporting said band comprises (a) a pair of spaced apart rotatable members about which said band is partially trained such that said run extends between said members and (b) means supporting said run between said members but permitting liquid to drain freely through the band from the sludge which is deposited on the upper surface of said run.

5. The sludge thickening apparatus defined in any one of the preceding claims 1, 2 or 3 wherein the slope of said chute is uniform and the discharge end of the chute is so close to said run that the vertical displacement of the sludge flowing off said discharge end and onto said run is insubstantial.

6. The sludge thickening apparatus defined in claim 1 comprising means for collecting the liquid which drains through said band and for passing the collected liquid in a stream through said band to wash residual sludge from the band after the band passes beyond said sludge removal means.

7. A sludge thickening apparatus comprising means for dosing sludge to be thickened with a floc-producing agent, a tank for receiving and holding the dosed sludge for a sufficient period of time to allow for the development of a floc structure, means comprising a movable, sludge-receiving, liquid permeable band for draining liquid to be removed from the floc-containing sludge solely under the influence of gravity to thicken the sludge without pressing or otherwise disturbing the floc-containing sludge, said band having a sludge-receiving, liquid drainage run which extends at least generally horizontally, means for conveying the floc-containing sludge from said tank to said run in such a manner that said floc structure is retained, means (a) for supporting said band for travel along an endless path and (b) for driving said band for conveying the floc-containing sludge along said run, and means for removing the sludge from the band after the sludge passes beyond said run, said sludge conveying means comprising (a) a weir located at a level lying above the level of said run and (b) a chute for delivering sludge from said weight to said run, said weir constituting a sludge outlet for said tank and having a discharge edge located at and at the same level as an upstream end of said chute for discharging the floc-containing sludge from said tank directly onto said chute, said chute being inclined relative to said run such that the angle included between said chute and said run is not more than approximately 5 degrees, and said chute extending directly from said discharge edge to nearly the level of said run immediately adjacent to said run for gently depositing the floc-containing sludge on said run, said band providing for the gravity drainage of liquid from the sludge as the sludge is conveyed along said run.

* * * * *